United States Patent
Finzo

(10) Patent No.: US 11,597,547 B2
(45) Date of Patent: *Mar. 7, 2023

(54) STRAPPING APPARATUS

(71) Applicant: Signode Industrial Group LLC, Glenview, IL (US)

(72) Inventor: Flavio Finzo, Würenlos (CH)

(73) Assignee: Signode Industrial Group LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/220,341

(22) Filed: Apr. 1, 2021

(65) Prior Publication Data

US 2021/0221543 A1    Jul. 22, 2021

Related U.S. Application Data

(63) Continuation of application No. 16/267,744, filed on Feb. 5, 2019, now abandoned, which is a continuation (Continued)

(30) Foreign Application Priority Data

Nov. 14, 2011    (CH) ..................... 01818/11

(51) Int. Cl.
   B65B 13/34    (2006.01)
   B29C 65/00    (2006.01)
   (Continued)

(52) U.S. Cl.
   CPC .......... *B65B 13/34* (2013.01); *B29C 65/0618* (2013.01); *B29C 66/1122* (2013.01);
   (Continued)

(58) Field of Classification Search
   CPC ..... B65B 13/34; B65B 13/327; B65B 13/025; B65B 13/22; B29C 65/0618;
   (Continued)

(56) References Cited

U.S. PATENT DOCUMENTS 2,194,108 A    3/1940 Parvin
2,707,429 A    5/1955 Leslie, II et al.
(Continued)

FOREIGN PATENT DOCUMENTS

CH    705745 A2    5/2013
CN    1109014 A    9/1995
(Continued)

OTHER PUBLICATIONS

"Advanced Welding Device and Maintenance", pp. 376-379, with English translation pp. 376-381, available prior to Nov. 14, 2011.
(Continued)

*Primary Examiner* — Thomas M Wittenschlaeger
(74) *Attorney, Agent, or Firm* — Neal, Gerber & Eisenberg LLP

(57) ABSTRACT

A strapping apparatus for strapping articles with a strapping band having a base plate provided for arranging on an article, a tensioning device with which a band tension can be applied to the strapping band, and a sealing device for permanently connecting two band layers to each other.

11 Claims, 3 Drawing Sheets

Related U.S. Application Data of application No. 14/357,904, filed as application No. PCT/US2012/064917 on Nov. 14, 2012, now Pat. No. 10,227,149.

(51) Int. Cl.
  *B65B 13/32* (2006.01)
  *B29C 65/06* (2006.01)
  *B65B 13/02* (2006.01)
  *B65B 13/22* (2006.01)
  *B29L 31/00* (2006.01)

(52) U.S. Cl.
  CPC ........ *B29C 66/344* (2013.01); *B29C 66/3494* (2013.01); *B29C 66/4322* (2013.01); *B29C 66/4324* (2013.01); *B29C 66/49* (2013.01); *B29C 66/8161* (2013.01); *B29C 66/8221* (2013.01); *B29C 66/8324* (2013.01); *B29C 66/861* (2013.01); *B29C 66/8618* (2013.01); *B29C 66/9492* (2013.01); *B65B 13/025* (2013.01); *B65B 13/22* (2013.01); *B65B 13/327* (2013.01); *B29C 66/71* (2013.01); *B29L 2031/7276* (2013.01)

(58) Field of Classification Search
  CPC ............ B29C 66/8324; B29C 66/3494; B29C 66/861; B29C 66/344; B29C 66/49; B29C 66/1122; B29C 66/71; B29C 66/4324; B29C 66/9492; B29C 66/8618; B29C 66/8221; B29C 66/8161; B29C 66/4322; B29L 2031/7276; B29K 2023/12; B29K 2067/003
  See application file for complete search history.

(56) References Cited

U.S. PATENT DOCUMENTS

| | | |
|---|---|---|
| 3,120,171 A | 2/1964 | Hall et al. |
| 3,232,217 A | 2/1966 | Harmon et al. |
| 3,367,374 A | 2/1968 | Meier et al. |
| 3,654,033 A | 4/1972 | Angarola et al. |
| 3,674,972 A | 7/1972 | Stahnke |
| 3,755,045 A | 8/1973 | Takami |
| 3,873,387 A | 3/1975 | Schoening |
| 4,011,807 A | 3/1977 | Kobiella |
| 4,015,643 A | 4/1977 | Cheung |
| 4,037,073 A | 7/1977 | Becker |
| 4,050,372 A | 9/1977 | Kobiella |
| 4,077,313 A | 3/1978 | Lems et al. |
| 4,240,865 A | 12/1980 | Kyts |
| 4,313,779 A | 2/1982 | Nix |
| 4,378,262 A | 3/1983 | Annis |
| 4,450,032 A | 5/1984 | Wehr |
| 4,451,865 A | 5/1984 | Warner et al. |
| 4,502,911 A | 3/1985 | Discavage |
| 4,516,488 A | 5/1985 | Bartzick et al. |
| 4,535,730 A | 8/1985 | Allen |
| 4,572,064 A | 2/1986 | Burton |
| 4,707,390 A | 11/1987 | Cheung |
| 4,724,659 A | 2/1988 | Mori et al. |
| 4,776,905 A | 10/1988 | Cheung et al. |
| 4,820,363 A | 4/1989 | Fischer |
| 4,836,873 A | 6/1989 | Mitanihara et al. |
| 4,952,271 A | 8/1990 | Cheung et al. |
| 5,105,130 A | 4/1992 | Barker et al. |
| 5,133,532 A | 7/1992 | Figiel et al. |
| 5,140,126 A | 8/1992 | Ishibashi |
| 5,141,591 A | 8/1992 | Boek et al. |
| 5,146,847 A | 9/1992 | Lyon et al. |
| 5,155,982 A | 10/1992 | Boek et al. |
| 5,159,218 A | 10/1992 | Murry et al. |
| 5,165,532 A | 11/1992 | Pipich et al. |
| 5,169,480 A | 12/1992 | Toppel et al. |
| 5,267,508 A | 12/1993 | Yoshino |
| 5,333,438 A | 8/1994 | Gurak et al. |
| 5,379,576 A | 1/1995 | Koyama |
| 5,380,393 A | 1/1995 | Drabarek et al. |
| 5,509,594 A | 4/1996 | Maggioni |
| 5,516,022 A | 5/1996 | Annis |
| 5,563,482 A | 10/1996 | Shaw et al. |
| 5,651,306 A | 7/1997 | Hoshino |
| 5,689,943 A | 11/1997 | Wehr |
| 5,690,023 A | 11/1997 | Stamm et al. |
| 5,798,596 A | 8/1998 | Lordo |
| 5,809,873 A | 9/1998 | Chak et al. |
| 5,831,404 A | 11/1998 | Ishii |
| 5,853,524 A | 12/1998 | Nix |
| 5,947,166 A | 9/1999 | Doyle et al. |
| 5,954,899 A | 9/1999 | Figiel et al. |
| 6,003,578 A | 12/1999 | Chang |
| 6,109,325 A | 8/2000 | Chang |
| 6,131,634 A | 10/2000 | Chang |
| 6,308,760 B1 | 10/2001 | Finzo et al. |
| 6,332,306 B1 | 12/2001 | Finzo et al. |
| 6,338,375 B1 | 1/2002 | Harada |
| 6,367,732 B1 | 4/2002 | Bobren et al. |
| 6,405,766 B1 | 6/2002 | Benjey |
| 6,463,721 B1 | 10/2002 | Su et al. |
| 6,516,715 B1 | 2/2003 | Reiche |
| 6,533,013 B1 | 3/2003 | Nix |
| 6,568,158 B2 | 5/2003 | Shibazaki et al. |
| 6,568,159 B2 | 5/2003 | Kawai et al. |
| 6,578,337 B2 | 6/2003 | Scholl et al. |
| 6,584,891 B1 | 7/2003 | Smith et al. |
| 6,606,766 B2 | 8/2003 | Ko |
| 6,644,713 B2 | 11/2003 | Del et al. |
| 6,668,516 B2 | 12/2003 | Sakaki et al. |
| 6,715,375 B2 | 4/2004 | Nestler |
| 6,729,357 B2 | 5/2004 | Marsche |
| 6,732,638 B1 | 5/2004 | Rometty et al. |
| 6,734,379 B1 | 5/2004 | Savadian et al. |
| 6,745,678 B1 | 6/2004 | Liu et al. |
| 6,789,469 B1 | 9/2004 | Tipton et al. |
| 6,817,159 B2 | 11/2004 | Sakaki et al. |
| 6,820,402 B1 | 11/2004 | Haberstroh et al. |
| 6,907,717 B2 | 6/2005 | Nix |
| 6,911,799 B2 | 6/2005 | Jensen |
| 6,918,235 B2 | 7/2005 | Nix |
| 6,931,986 B1 | 8/2005 | Liu et al. |
| 6,994,019 B1 | 2/2006 | Liu et al. |
| 7,011,000 B2 | 3/2006 | Kushida et al. |
| 7,073,431 B1 | 7/2006 | Chen |
| 7,086,213 B2 | 8/2006 | Stauber |
| 7,210,506 B2 | 5/2007 | Magno |
| 7,240,612 B1 | 7/2007 | Kirar et al. |
| 7,249,862 B2 | 7/2007 | Shirane |
| 7,263,928 B1 | 9/2007 | Holden et al. |
| 7,270,055 B1 | 9/2007 | Haberstroh et al. |
| 7,312,609 B2 | 12/2007 | Schmollngruber et al. |
| 7,428,866 B2 | 9/2008 | Reiche |
| 7,456,608 B2 | 11/2008 | Kageler et al. |
| 7,497,068 B2 | 3/2009 | Nasiatka et al. |
| 7,681,496 B2 | 3/2010 | Takidis et al. |
| 7,703,330 B2 | 4/2010 | Miyazaki et al. |
| D629,321 S | 12/2010 | Neeser et al. |
| 7,948,336 B2 | 5/2011 | Park |
| D651,498 S | 1/2012 | Neeser et al. |
| D653,923 S | 2/2012 | Neeser et al. |
| 8,198,839 B2 | 6/2012 | Katou et al. |
| 8,378,600 B2 | 2/2013 | Katou et al. |
| 9,174,752 B2 | 11/2015 | Neeser et al. |
| 9,193,486 B2 | 11/2015 | Neeser et al. |
| 9,254,932 B2 | 2/2016 | Neeser et al. |
| 9,284,080 B2 | 3/2016 | Neeser et al. |
| 9,296,501 B2 | 3/2016 | Haberstroh et al. |
| 9,315,283 B2 | 4/2016 | Neeser et al. |
| 9,487,314 B2 | 11/2016 | Finzo |
| 9,586,708 B2 | 3/2017 | Finzo |
| 9,745,090 B2 | 8/2017 | Haberstroh et al. |
| 10,227,149 B2 * | 3/2019 | Keller .................. B29C 66/344 |
| 2002/0100146 A1 | 8/2002 | Ko |
| 2002/0129717 A1 | 9/2002 | Helland et al. |

(56) References Cited

U.S. PATENT DOCUMENTS

| | | |
|---|---|---|
| 2002/0134811 A1 | 9/2002 | Napier et al. |
| 2003/0010223 A1 | 1/2003 | Lopez |
| 2003/0024217 A1 | 2/2003 | Schwede et al. |
| 2003/0025610 A1 | 2/2003 | Helmrich |
| 2003/0145900 A1 | 8/2003 | Jensen et al. |
| 2004/0206251 A1 | 10/2004 | Nix |
| 2004/0237806 A1 | 12/2004 | Sickels |
| 2004/0244605 A1 | 12/2004 | Pearson et al. |
| 2004/0255562 A1 | 12/2004 | Haberstroh et al. |
| 2004/0255797 A1 | 12/2004 | Bobren et al. |
| 2005/0279198 A1 | 12/2005 | Kushida et al. |
| 2006/0108180 A1 | 5/2006 | Grach et al. |
| 2006/0192527 A1 | 8/2006 | Kageler et al. |
| 2007/0163452 A1 | 7/2007 | Bobren et al. |
| 2007/0227370 A1 | 10/2007 | Reiche |
| 2008/0072539 A1 | 3/2008 | Morrison |
| 2008/0196911 A1 | 8/2008 | Krapf et al. |
| 2009/0013656 A1 | 1/2009 | Nasiatka et al. |
| 2009/0114308 A1 | 5/2009 | Nelson et al. |
| 2010/0107573 A1 | 5/2010 | Neeser et al. |
| 2010/0154661 A1 | 6/2010 | Bobren et al. |
| 2011/0056392 A1 | 3/2011 | Neeser et al. |
| 2011/0100233 A1 | 5/2011 | Neeser et al. |
| 2011/0146505 A1 | 6/2011 | Schwede |
| 2011/0253480 A1 | 10/2011 | Goodman et al. |
| 2012/0160364 A1 | 6/2012 | Katou et al. |
| 2012/0210682 A1 | 8/2012 | Gardner et al. |
| 2012/0216688 A1 | 8/2012 | Liu et al. |
| 2013/0014653 A1 | 1/2013 | Lai |
| 2013/0014654 A1 | 1/2013 | Lai |
| 2013/0098252 A1 | 4/2013 | Haberstroh et al. |
| 2013/0276415 A1 | 10/2013 | Haberstroh et al. |
| 2014/0083310 A1 | 3/2014 | Hoehn et al. |
| 2014/0290179 A1 | 10/2014 | Keller |
| 2019/0168900 A1 | 6/2019 | Keller |

FOREIGN PATENT DOCUMENTS

| | | |
|---|---|---|
| CN | 2266566 Y | 11/1997 |
| CN | 2486463 Y | 4/2002 |
| CN | 1386675 A | 12/2002 |
| CN | 1386676 A | 12/2002 |
| CN | 1396091 A | 2/2003 |
| CN | 1235769 C | 1/2006 |
| CN | 101164416 A | 4/2008 |
| CN | 101486329 A | 7/2009 |
| CN | 201411058 Y | 2/2010 |
| CN | 102101539 A | 6/2011 |
| CN | 202100012 U | 1/2012 |
| DE | 19751861 A1 | 1/1999 |
| DE | 20321137 U1 | 1/2006 |
| DE | 102006007990 A1 | 8/2007 |
| DE | 102009047443 A1 | 6/2011 |
| DE | 202011050797 U1 | 11/2011 |
| EP | 0744343 A1 | 11/1996 |
| EP | 1413519 A1 | 4/2004 |
| EP | 2243708 A1 | 10/2010 |
| GB | 489050 A | 7/1938 |
| GB | 1136846 A | 12/1968 |
| GB | 1136847 A | 12/1968 |
| GB | 1161827 A | 8/1969 |
| GB | 2041869 A | 9/1980 |
| GB | 2481724 A | 1/2012 |
| JP | 000055154208 A | 12/1980 |
| JP | 000055154209 A | 12/1980 |
| JP | S5638220 A | 4/1981 |
| JP | 648412 A | 2/1994 |
| JP | H0671573 A | 3/1994 |
| JP | 6135410 A | 5/1994 |
| JP | H07300108 A | 11/1995 |
| JP | 811823 A | 1/1996 |
| JP | H08258808 A | 10/1996 |
| JP | H09283103 A | 10/1997 |
| JP | 3044132 B2 | 5/2000 |
| JP | 2003231291 A | 8/2003 |
| JP | 2003348899 A | 12/2003 |
| JP | 2004108593 A | 4/2004 |
| JP | 2004241150 A | 8/2004 |
| JP | 2007276042 A | 10/2007 |
| JP | 2008023694 A | 2/2008 |
| JP | 2011518086 A | 6/2011 |
| JP | 2011518088 A | 6/2011 |
| RU | 1772784 C | 10/1992 |
| RU | 2161773 C2 | 1/2001 |
| RU | 2355821 C1 | 5/2009 |
| WO | 9922277 A1 | 5/1999 |
| WO | 0189929 A1 | 11/2001 |
| WO | 2006048738 A1 | 5/2006 |
| WO | 2007116914 A1 | 10/2007 |
| WO | 2009129633 A1 | 10/2009 |
| WO | 2009129634 A1 | 10/2009 |
| WO | 2009129636 A1 | 10/2009 |
| WO | 2009129637 A1 | 10/2009 |

OTHER PUBLICATIONS

"International Search Report and Written Opinion", PCT/US2012/064917, dated Apr. 4, 2013.

Bender, "Lithium Ion Technology: Shaping Power Tool", Air Conditioning, Heating, and Refrigeration News, vol. 228, Issue 14, p. 18 (3 pages), Jul. 31, 2006.

Emandi, Ali, "Brushless DC Motor Drives", Energy-Efficient Electrical Motors, 3rd ed., Para. 270-272, CRC Press & Marcel Dekker (3 pages).

Orgapack, "A Quantum Leap In Strapping", OR-T 250/400 (4 pages), Nov. 13, 2011.

\* cited by examiner

STRAPPING APPARATUS

This patent application is a continuation of, and claims priority to and the benefit of, U.S. patent application Ser. No. 16/267,744, which was filed on Feb. 5, 2019, which is a continuation of, and claims priority to and the benefit of, U.S. patent application Ser. No. 14/357,904, which was filed on May 13, 2014, and issued as U.S. Pat. No. 10,227,149 on Mar. 12, 2019, which is a U.S. national stage application of International Patent Application No. PCT/US2012/064917, which was filed on Nov. 14, 2012, which claims priority to Swiss Patent Application No. 01818/11, which was filed Nov. 14, 2011, the entire contents of each are incorporated by reference herein.

The invention relates to a strapping apparatus, in particular to a portable, mobile, battery-operated strapping apparatus, for strapping articles with a strapping band, having a base plate which is provided for arranging on an article, having a tensioning device with which a hand tension can be applied to the strapping band, the tensioning device being provided for this purpose with an actuable tensioning tool which can be brought into and out of contact with the band, having a sealing device with which, by contact with the band, two band layers can be permanently connected to each other by forming a seal between the two band layers, being provided with a clamping device with which the band can be clamped in the strapping apparatus, and being provided with at least one actuating element with which a magnitude of a tensioning force which can be applied to the strapping band or a magnitude which in dependent on the tensioning force can be set.

Mobile strapping apparatuses of this type, like the strapping apparatus according to the invention, are used for strapping articles with a plastics strap. For this purpose, a loop of the particular plastics strap is placed around the article. The plastics strap is generally pulled off here from a supply reel. After the loop is completely placed around the article, the end region of the band overlaps with a section of the band loop. The strapping apparatus is then applied to said two-layered region of the band, the band is clamped in the process in the strapping apparatus, a band tension is applied to the band loop by means of the tensioning device, and a seal is produced between the two band layers by friction welding at the loop. In this connection, pressure is applied to the band in the region of two ends of the band loop by a fraction shoe moving in an oscillating manner. The pressure and the heat arising because of the movement melt the band, which generally contains plastic, locally for a short time. This results in a permanent connection, which at the most can be released again with a great force, between the two band layers between the two band layers. At the same time, the loop is severed from the supply reel. The respective article is thereby strapped.

Strapping apparatuses of the type in question are provided in particular for mobile use, in which the units are intended to be carried along by a user to the particular use location and are not intended to be dependent there on the use of externally supplied mains power. In the case of previously known strapping units, the power required for the designated use of such strapping units for tensioning a strapping band around any article and for producing a seal is generally provided by an electric battery or else also by compressed air. Mobile strapping apparatuses of the type in question are frequently in permanent use in the goods packaging industry, in particular using conditions which are identical or at least scarcely differ from one another. In industrial use, a multiplicity of identical strappings are frequently carried out directly after one another. For this purpose, process parameters, such as, for example, tensioning force and welding time, are customarily preset on the strapping unit. Welding time is to be understood here as meaning the time during which heat is introduced into the band layers to be connected to one another by means of an oscillating frictional movement of a frictional element. The strapping process itself and/or individual separate subprocesses of the strapping operation, such as, for example, the tensioning operation and the welding operation, are initiated by actuation of actuating elements of the strapping apparatus, for example by actuation of one or more buttons. After the strapping operation including the production of a seal is finished, the strapping unit can be removed from the produced strapping and the strapped article.

It has now been shown that, in particular in the case of comparatively thick and wide straps, the seals produced by friction welding frequently do not have the desired tensile strength, even if the welding time length has been adapted to the thickness and width of the bands.

The invention is therefore based on the object of providing measures by means of which the strength of friction-welded band strapping seals produced by strapping apparatuses can be improved.

This object is achieved in the case of a strapping apparatus of the type mentioned at the beginning in that a cooling time period for the seal, during which the strapping apparatus keeps the strapping band clamped following a welding time, is variable depending on the band tension which is variably adjustable at the strapping apparatus.

In previous solutions, the cooling time which follows the welding time and during which the strapping unit still clamps the band and the strapping unit cannot yet be pulled off was generally preset unchangeably. A solution has also already been disclosed, in which the cooling time is dependent on the previously provided welding time. However, neither solution has led to a completely satisfactory solution. The solution according to the invention therefore already includes the consideration that the seal should be matched to the band tension applied in each case to the band and, in the event of, for example, increased band tension, a longer cooling time should be provided for the friction-welded seal. The longer cooling time means that the material heated during the friction welding also has a longer time to cool and to solidify, which contributes to an increase in the load-bearing capacity of the seal. By this means, the strength or load-bearing capacity of the seal can therefore be adapted to the band tension already applied during the strapping operation and acting on the seal.

It has been shown that, by this means, the number of friction-welded seals which fail during use can be noticeably reduced. Since although the cooling time should last as long as necessary but, in order to obtain as many strappings as possible within a certain time, should also only last as long as necessary, an optimization in respect of actually obtained strappings and the quality therefore with regard to the strength of the seals can be undertaken with the invention.

In a preferred embodiment of the invention, in order to determine the cooling time, during which the strapping apparatus still keeps the band in the strapping apparatus in particular by means of a clamping device, in addition to the tensioning force set the length of the welding time is also taken into consideration. Since the length of the welding time determines via the amount of power introduced into the seal, the welding time also has influence on the length of the cooling time to be kept to as far as possible in order to obtain good strength. By this means, the cooling time period can be further optimized until the strapping apparatus loosens and again releases the clamping of the band.

In order to simplify the handling of the strapping operation in conjunction with the selection of the cooling time period, automatic selection of the cooling time can be provided in an advantageous embodiment of the invention. Said selection can be undertaken in particular by a controlling means of the strapping apparatus with reference to an algorithm stored in the controlling means. The algorithm is intended to take into consideration in a predetermined manner the which is in each case set at the strapping apparatus and by the tensioning device during the tensioning operation to the band which is operatively connected to the tensioning device in order to produce a band tension. Provision is preferably also made in the algorithm to take into consideration the welding time which can be set in this embodiment according to the invention. The cooling time period is therefore predetermined by the strapping apparatus itself and taken into consideration during the strapping operation.

An expedient possibility of determining the cooling time by means of the controlling means can make provision for each adjustable welding time to be assigned a certain cooling time period, wherein at least some of the different welding time values are intended also to be assigned different cooling time values. Provision may be made in particular to be able to adjust the welding time in stages and to assign a different time value for the cooling time to at least some of said stages, preferably to each stage. Then, depending on the likewise adjustable tensioning force, said particular value can be multiplied by a factor factor assigned to the respective tensioning force. Different factors should also be assigned here to different tensioning force values. Like the welding time, the tensioning force may also be adjustable preferably in stages.

Further preferred refinements of the invention emerge from the claims, the description and the drawing.

The invention is explained in more detail with reference to exemplary embodiments which are illustrated purely schematically in the figures, in which.

Figure 1:
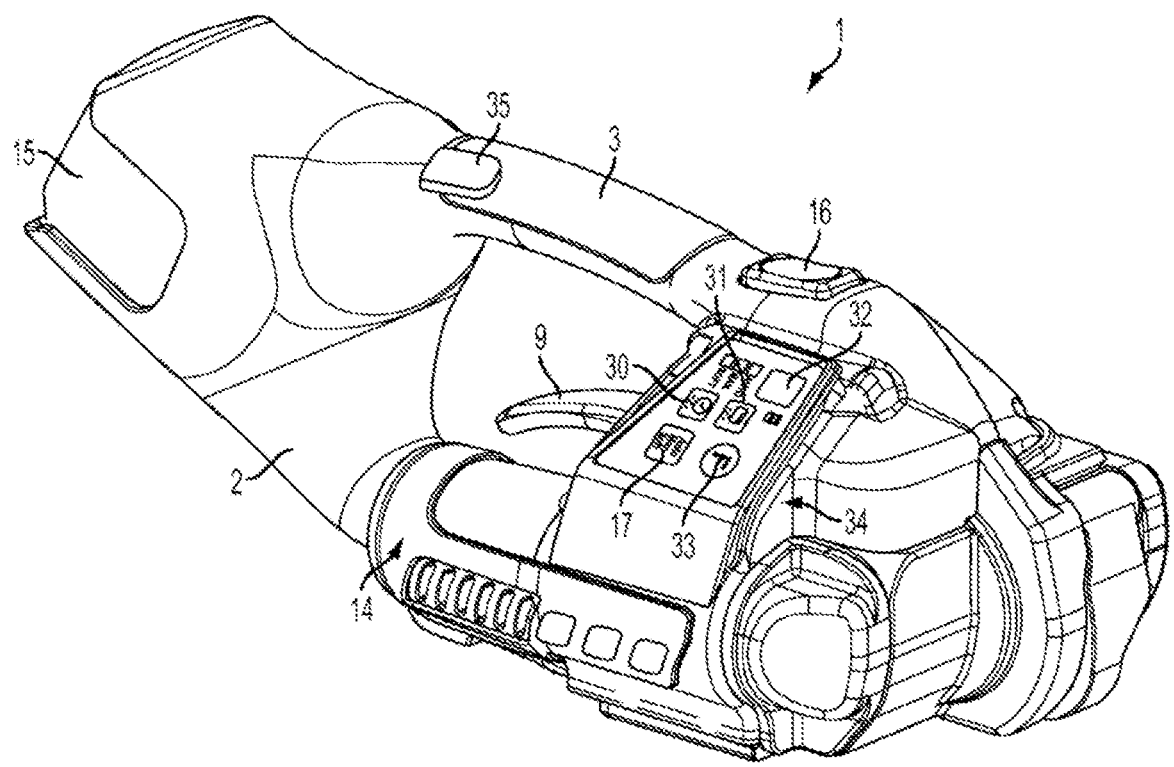
FIG. 1 shows a perspective illustration of a strapping apparatus according to the invention.
Figure 2:
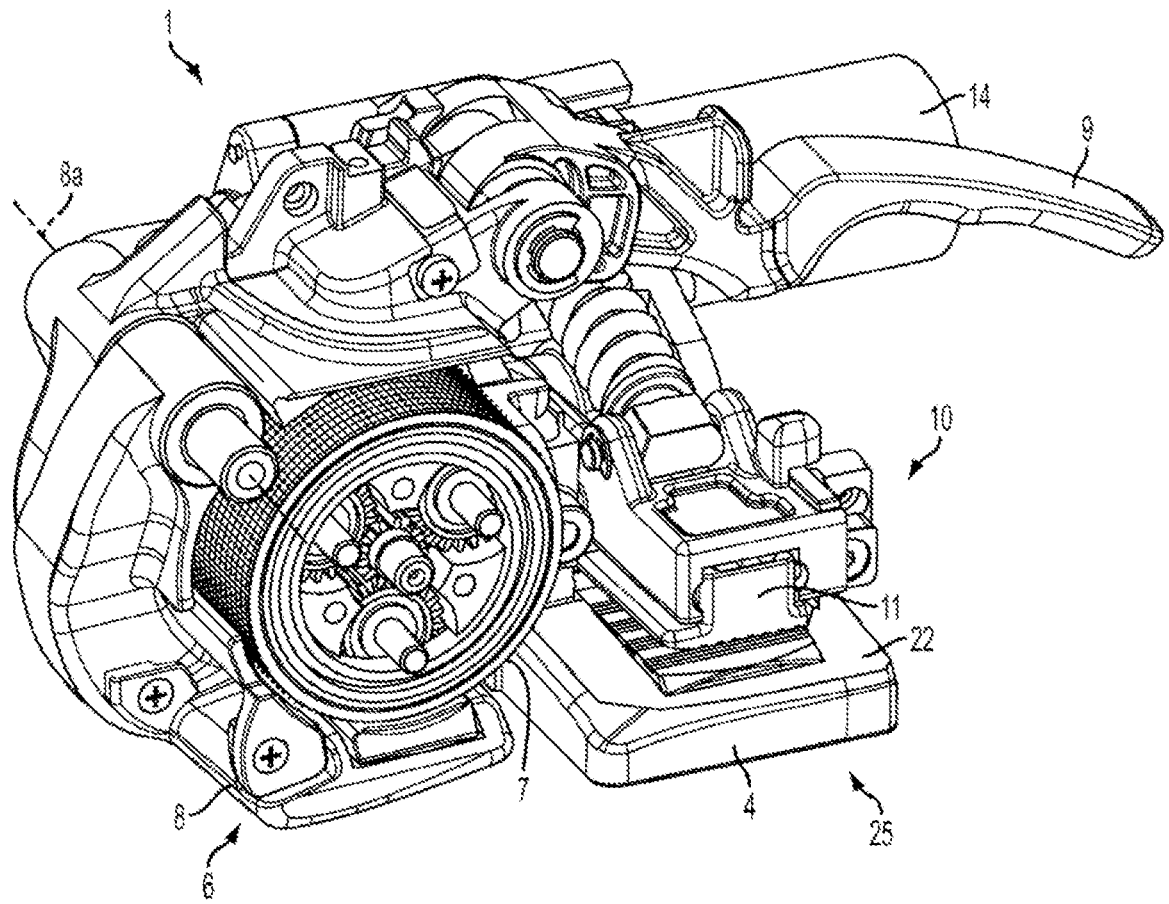
FIG. 2 shows the strapping unit from FIG. 1 without the housing.

The mobile strapping unit 1 according to the invention that is shown in FIGS. 1 and 2 and is exclusively manually actuated has a housing 2 which surrounds the mechanism of the strapping unit and on which a handle 3 for handling the unit is formed. The strapping unit is furthermore provided with a base plate 4, on the lower side of which a base surface 5 for arranging on an object to be packaged is provided. All of the functional units of the strapping unit 1 are fastened on the base plate 4 and to the strapping unit carrier (not illustrated specifically) which is connected to the base plate.

With the strapping unit 1, a loop (not illustrated specifically in FIG. 1) of a plastics band, for example of polypropylene (PP) or polyester (PET), which has previously been placed around the object to be packaged can be tensioned by means of a tensioning device 6 of the strapping unit. For this purpose, the tensioning device has, as tensioning tool, a tensioning wheel 7 with which the band can be detected for a tensioning operation. In this connection, the tensioning wheel 7 interacts with a rocker 8 which can be pivoted about a rocker pivot axis 8a by means of a rocker lever 9 from an end position at a distance from the tensioning wheel into a second end position, in which the rocker 8 is pressed against the tensioning wheel 7. In the process, the band located between the tensioning wheel 7 and the rocker 8 is also pressed against the tensioning wheel 7. It is then possible, by rotation of the tensioning wheel 7, to provide the band loop with a sufficiently high band tension for the packaging purpose.

Subsequently, at a point of the band loop at which two layers of the band lie one above the other, the two layers can be welded by means of the sealing device embodied in the form of a friction-welding device 13 of the strapping unit. By this means, the hand loop can be permanently sealed. For this purpose, the friction-welding device 13 is provided with a welding shoe 20 which melts the two layers of the strapping band by applying mechanical pressure to the strapping band and simultaneously undertaking an oscillating movement at a predetermined frequency. The plasticized and molten regions of the two band layers flow into each other and, after the band is cooled during a cooling time, a connection then arises between the two band layers. If required, the band loop can then be severed at the same time from a supply reel (not illustrated) of the band by means of a cutting device (not illustrated specifically) of the strapping unit 1. The strapping unit 1 can subsequently be removed from the article and the band strapping produced.

The actuation of the tensioning device 6, the advancing of the friction-welding device 13 by means of a transfer device of the friction-welding device 13 and the use of the friction-welding device per se and also the actuation of the butting device take place using just one common electric motor 14 which provides a driving movement for each of said components. The structural solution provided for this purpose corresponds to that described in WO 2009/129634 A1, the disclosure of which is hereby incorporated by reference. For the supply of power, a battery 15 which is interchangeable and in particular is removable for charging is arranged on the strapping unit. A supply of another external auxiliary power, such as, for example, compressed air, or further electricity, is not provided in the strapping unit according to FIGS. 1 and 2.

In the present case, the portable, mobile strapping unit 1 has an actuating element 16 which is embodied in the form of a pressure switch, is provided for starting up the motor and is referred to below as tensioning button. Three modes can be set for the actuating element 16 by means of a mode switch 17. In the first mode, both the tensioning device 6 and the friction-welding device 13 are triggered successively and in an automated manner by actuation of the actuating element 16, without further activities of an operator being required. In order to set the second mode, the switch 17 is switched into a second switching mode. In the second possible mode, only the tensioning device 6 is the triggered by actuation of the tensioning button 16. For the separate triggering of the friction-welding device 13, the tensioning button 16 has to be actuated a second time by the operator. The third mode is of a semi-automatic type, in which the actuating element provided the tensioning button 16 has to be pressed until the tensioning force, which is preadjustable in stages, or tensile stress is achieved in the bend. In this mode, it is possible to interrupt the tensioning process by the tensioning button 16, for example in order to attach edge protectors under the strapping band to the article being strapped. By pressing of the tensioning button 16, the tensioning process can then be continued again. This third mode can be combined both with a friction-welding operation to be triggered separately and with an automatically following friction-welding operation.

The power supply is ensured by the battery 15 in the form of a lithium-ion battery. Batteries of this type are based on a plurality of independent lithium-ion cells, in which chemical processes which are in each case at least substantially separate from one another proceed in order to produce a potential difference between two poles of the particular cell. The exemplary embodiment involves a lithium-ion battery from the manufacturer Robert Bosch GmbH, D-70745 Leinfelden-Echterdingen. The battery in the exemplary embodiment has 20 cells and a capacity of 2.6 ampere-hours at an operating voltage of 36 volts.

Figure 4:
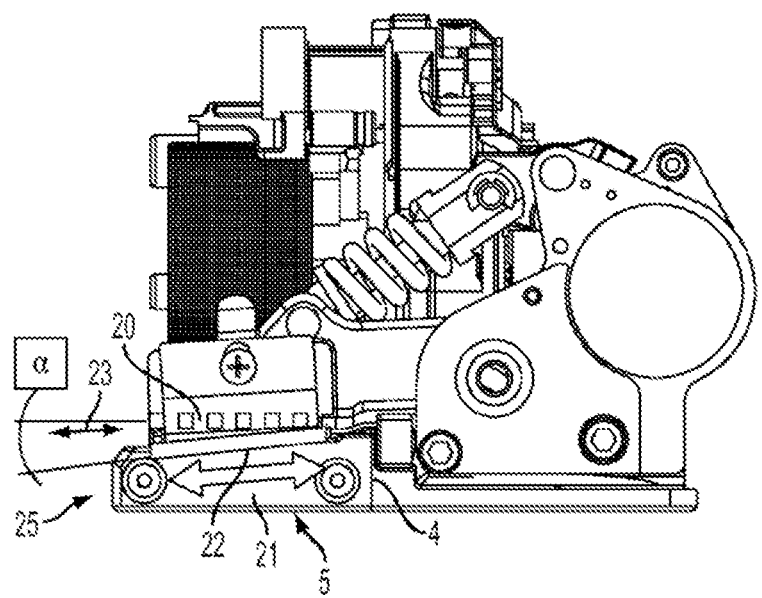
FIG. 4 shows the strapping unit in a view from the rear toward the sealing device.

As can be seen in particular in the view from the rear in FIG. 4, the sealing device which is embodied in the form of a friction-welding device has a plate with a substantially rectilinear or planar counter-holder surface 22 as the welding counter-holder 21. With regard to a direction 23 transverse to the longitudinal course 24 of the band section passed through the sealing device, the counter-holder surface 22 is inclined downwardly toward that outer side 25 of the strapping unit 1 on which the tensioning and sealing devices are located. The inclination takes place at a preferred angle α of 3° with regard to a course or an alignment of the tensioning counter-holder surface 28 of the tensioning counter-holder 27, which is arranged on the rocker 8 and interacts with the tensioning wheel, in a direction transverse to the longitudinal course 24 of the band through the strapping apparatus. As an alternative thereto, the angle α may be selected from a range of 1° to 45°, preferably from a range of 2° to 25°. The tensioning counter-holder surface is of concave design in the longitudinal direction 24, and therefore, when the rocker presses against the tensioning wheel 7, the band bears in a planar manner both against the tensioning wheel surface and against the tensioning counter-holder surface 28. Therefore, in directions transverse to the longitudinal course of the band, the alignment of the tensioning wheel surface also corresponds to the alignment of the tensioning counter-holder surface 28.

The inclination may also be related to the base plate 4, in particular to the base surface 5 provided for arranging on articles. The base surface 5 is likewise of flat design, and therefore the strapping unit 1 can be arranged in as planar a manner as possible on the particular article. If the base surface is considered to be an X-Y surface of a Cartesian coordinate system, the inclination of the counter-holder surface 22 can be described by the counter-holder surface 22 having a linearly constant increase of the Z component in the Y direction if the X direction is considered to be parallel to the longitudinal direction 24 of the strapping unit. In the illustration of FIG. 4, this results in a conical arrangement between the counter-holder surface 22 and the base surface 5, wherein the arrangement of the two surfaces 5, 22 tapers toward that outer side of the strapping unit on which the counter-holder surface 22 is located.

During the formation of a seal, after the band is placed as a loop around the article, in the process guided as a single layer through the tensioning device 6 and as a double layer through the sealing device, and the designated band tension is applied by engagement of the tensioning device 6 in the upper band layer, which is guided through the tensioning device 6, and a return motion of the band, the welding shoe 20 is lowered in the direction of the counter-holder surface 22. Depending on the selected operating mode of the strapping unit 1, this takes place automatically as a consequence of the tensioning operation being finished or on account of separate triggering of the friction-welding operation by actuation of the button provided for this purpose. During the friction-welding operation, the band continues to be clamped between the tensioning wheel 7 and the tensioning counter-holder 27 and is held there during the formation of the seal. During this method section of the formation of the strapping, the tensioning device has the function of a band clamp or clamping device which, by means of two interacting clamping elements, clamps the band therebetween.

The lowering of the welding shoe 20 causes the two band layers passed through the sealing device to be pressed against each other and against the counter-holder surface 22. Owing to the clamping of the band in the tensioning device 6 and the inclination of the counter-holder surface 22, a twisting, i.e. torsional stress of the band, arises here in said band section. The band here is aligned with the two band surfaces thereof parallel to the base surface 5 at least in the region of a radius line of the tensioning wheel 7, said radius line being oriented perpendicularly to the base surface 5. The band is arranged in two layers in the sealing device, wherein the lower band layer rests with the lower band surface thereof against the inclined counter-holder surface 22 and is pressed thereagainst. With the upper surface, the lower band layer rests against the lower surface of the upper band layer. The welding shoe 20 presses onto the upper surface of the upper band layer. Both band layers and the welding shoe 20 therefore take up the same inclination a as the inclination of the counter-holder surface. The twisting of the band therefore increases from the tensioning device 6 as fat as the sealing device. The twisting decreases again during the further course of the band behind the sealing device, i.e. in the direction away from the strapping unit.

In this position of the band, the friction-welding device 13 begins with the formation of the seal by means of the oscillating movement of the welding shoe transversely with respect to the longitudinal course of the band. By this means, the two band layers resting against each other are melted. The materials of the band layers flow into one another and are connected in an integrally bonded manner during the subsequent cooling as soon as the oscillating movement of the welding shoe is started.

Figure 3:
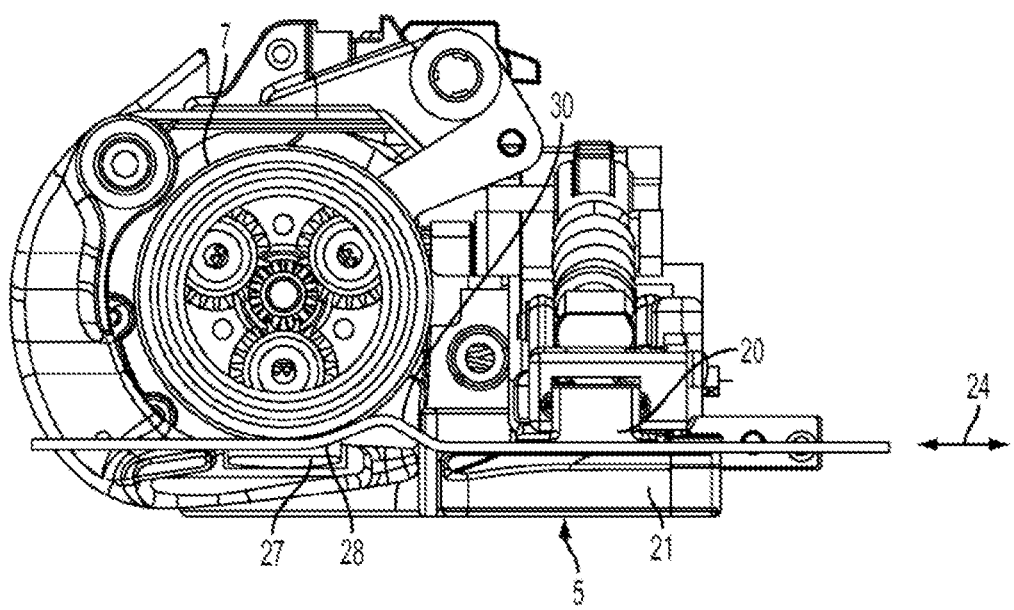
FIG. 3 shows the strapping unit from FIG. 2 with an inserted strapping band during the production of a seal.

As can be gathered from FIG. 3, during the production of the seal, a deflection or loop 30 is formed in the upper band layer between the clamping of the band in the tensioning device and the sealing device by the welding shoe 20 moving in an oscillating manner. The deflection or loop 30 is generated in a direction of the upper band layer which is substantially transverse to the direction of the oscillating movement of the welding shoe and also substantially transverse to the longitudinal extent of the upper band layer before the deflection or loop 30 is formed in the upper band layer. As has been shown, said loop is formed on account of the twisting of the band, thus reducing the power required for the welding movement of the welding shoe.

The welding shoe 20 is subsequently moved away from the counter-holder surface 22 and the tensioning device 6 detached from the band, thus loosening the clamping and releasing the two band layers. The resetting forces present in the band counter to the twisting lead to the band showing at least a tendency to automatically become detached from the counter-holder surface 22 and from the welding shoe 20. Such a detachment preferably already takes place entirely because of the resetting forces of the band. If the detachment does not already take place by this means, at least the forces additionally to be applied in order to detach the band and remove the latter from the sealing device are considerably reduced because of the resetting forces. In addition, the inclination of the counter-holder surface 22 and the associated geometrical formation of the sealing device also permit simpler removal of the band and simplex moving away of the strapping unit from the band strapping produced directly beforehand.

The strapping unit according to the invention is provided with a control panel which has a plurality of pressure-actuable buttons 17, 30, 31, 33 as actuating elements. With said buttons, the previously described different modes of the strapping unit and parameters of the strapping operations can be preselected and set. For example, by pressing a welding time button 30 once or repeatedly, the welding time can be selected from one of a plurality of welding time stages and stored. The tensioning force can be selected as one of a plurality of tensioning force stages, changed and stored by means of a tensioning force button 31. The values preset in such a manner are displayed on the display field 32 by the strapping unit and used in the strapping operations until the parameter values are changed again. The strapping operations themselves are triggered or started by the tensioning button 16, which is arranged in an ergonomically advantageous manner at the front end of the handle of the strapping unit 1, as a further actuating element. If the strapping unit 1 is held at the handle 3, the tensioning button 16 can be actuated with the thumb.

The strapping unit 1 is equipped with a button lock which can be switched on and off. By switching on the button lock, it is possible, inter alia, to prevent undesirable adjustment of previously undertaken settings at the strapping unit 1. For this purpose, in the exemplary embodiment, first of all a control button "function" 33, which is configured as a pushbutton and is located on the control panel of the strapping unit, has to be actuated and held. In addition, the tensioning button 16 arranged on the handle of the strapping unit has to be actuated by pressing. An acoustic signal then sounds and confirms that the keypad of the control panel is now locked. From then on, no changes to the settings can be undertaken via the control panel until the button lock is released again. The strapping unit may still carry out strappings which are triggered by actuation of the tensioning button 16. If, in this state, a button of the control panel is nevertheless actuated, an optical signal indicating that locking is present appears in the display field of the control panel. For this purpose, for example, an "L" for "locked" can be displayed. The button lock is unlocked in the same manner as the button lock was switched on, namely by actuation and holding of the operating button "function" 33 and by additional actuation of the tensioning button 16.

However, the button lock can be used also specifically to block only individual functions. For this purpose, the corresponding function button 30, 31, for example that for setting the welding time, can be actuated and held. While (only) one of the particular function buttons 30, 31 is still pressed, the tensioning button 16 can then be actuated, as a result of which, from then on, adjustments to the welding time, which is changeably adjustable per se, are no longer possible, since they are locked. In the same manner, other parameter adjustments which are individually selectable, in particular the tensioning force, can also be prevented in a specific manner. All that then needs to be done is to first of all press and to hold the function button 30, 31 corresponding to said function, for example for the tensioning force, and subsequently to press the tensioning button 16. All of said locks can be canceled in the same manner as they have been activated, namely also by pressing the corresponding function button 30, 31 and the tensioning button 16. In alternative embodiments, unlocking can also be undertaken in a different manner, for example by means of a separate unlocking button which is only assigned this function.

In addition, the button lock present on the strapping unit also has a mode by means of which the use of the strapping unit 1 can be entirely locked. Said lock is activated by the controlling means 34 of the strapping unit upon switching into the fully automatic operating mode and has the consequence that two buttons have to be actuated simultaneously to trigger a fully automatic strapping operation with the band "tensioning", "sealing" and "cutting" operations. In the exemplary embodiment, these are the tensioning button 16 arranged in the region of the front end of the handle 3 and next to the control panel and the release button 35 arranged in the region of the rear end and of the battery 15. The two buttons 16, 35 are at a distance from each other which does not allow an operator holding the strapping unit at the handle 3 by one hand to press the tensioning and the release button 16, 35 at the same time with said hand. The operator has to use his/her second hand for this purpose, thus making it possible to prevent inadvertent triggering of the strapping unit.

Each aspect of the concept of operation of the strapping unit concerning the described operation modes of the strapping unit as well as preselecting and setting certain parameters of the strapping method has relevance as preferred embodiments. Each of said aspects has also relevance as separate invention which is independent from other aspects of the present invention.

An algorithm by means of which, after the formation of a seal has taken place by friction welding of the two band ends lying one above the other in the strapping unit, a cooling time period for the seal is variably determined is stored In the controlling means 34 of the strapping apparatus. The cooling time begins at the end of the movement of the welding shoe 20. During the cooling time, the hind is clamped in the strapping unit in the same manner as during the friction-welding phase in the strapping unit and therefore the seal which has just been formed is relieved of the band tension during the solidification phase of the band material.

At the strapping unit 1, it is possible to set welding times of differing length at the control panel. In the exemplary embodiment, a total of, for example, seven stages are provided and are selectable for this purpose for the welding time period. Each of the seven welding times of differing length is assigned a cooling time of differing length. In this case, the assignment is undertaken in such a manner that the longer the welding time, the longer also is the assigned cooling time. Said allocation is preferably non-changeable.

In addition, the tensioning force which is present at the circumference of the tensioning wheel 7 and is transmittable to the band can be set at the strapping unit. The tensioning force can also be set in a plurality of stages, for example nine stages. Each of said settable tensioning force is assigned one of a plurality of factors with which the controlling means multiplies the cooling time arising from the welding time. Also in this case, the factor is larger, the longer the welding time. The time value arising from this multiplication with one of a plurality of factors is used by the controlling means as the actual cooling time. The controlling means keeps the band clamped in the strapping unit by means of the clamping device thereof during said (actual) cooling time and does not yet release said band. This means that, during this time, the band cannot be removed from the strapping unit. If, for example, at stage three of the welding time the cooling time is 3 s and at tensioning stage seven the factor is 2, this results in an actual cooling time of 3 s×2=6 s. After the end of this time, the controlling means opens or releases the clamping, as a result of which the strapping unit can be moved away from the band and the strapping produced.

LIST OF REFERENCE NUMBERS

1 Strapping
2 Housing
3 Handle
4 Base plate
5 Base surface
6 Tensioning device
7 Tensioning wheel
8 Rocker
8a Rocker pivot axis
9 Rocker lever
13 Friction-welding device
14 Motor
15 Battery
16 Tensioning button
17 Mode switch
18 Actuating element
19 Tensioning button
20 Welding shoe
21 Welding counter-holder
22 Counter-holder surface
23 Direction
24 Longitudinal course
25 Outer side
27 Tensioning counter-holder
28 Tensioning counter-holder surface
30 Welding time button
31 Tensioning force button
32 Display field
33 Operating button "function"
34 Controlling means
35 Release button

The invention claimed is:

1. A strapping apparatus for strapping an article with a strapping band, the strapping apparatus comprising:
   a tensioning device comprising a rotatable tensioning wheel;
   a tensioning counter-holder surface adjacent the tensioning wheel;
   a sealing device comprising a sealing counter-holder surface and a sealing element movable toward the sealing counter-holder surface, wherein the sealing counter-holder surface is angularly offset relative to the tensioning counter-holder surface in a direction transverse to a longitudinal direction of the strapping band when positioned in the tensioning and sealing devices; and
   a controller configured to:
      after the strapping band has been clamped between the tensioning wheel and the tensioning counter-holder surface, cause the tensioning wheel to rotate to draw tension in the strapping band; and
      cause the sealing element to move toward the sealing counter-holder surface to clamp two overlying layers of the strapping band between the sealing element and the sealing counter-holder surface, thereby causing a portion of the strapping band to twist across an entire width of the portion of the strapping band, and cause the sealing element to activate to seal the two overlying layers to each other.

2. The strapping apparatus of claim 1, wherein the sealing device comprises a friction-welding device, wherein the sealing element comprises a welding shoe, and wherein the controller is configured to cause the sealing element to activate by causing the welding shoe to oscillate.

3. The strapping apparatus of claim 1, further comprising a base plate having a planar base surface, wherein the sealing counter-holder surface is angularly offset relative to the base surface in the direction transverse to the longitudinal direction of the strapping band when positioned in the tensioning and sealing devices.

4. The strapping apparatus of claim 1, wherein the sealing counter-holder surface is angularly offset relative to the tensioning counter-holder surface by 45 degrees or less.

5. The strapping apparatus of claim 4, wherein the sealing counter-holder surface is angularly offset relative to the tensioning counter-holder surface by about 3 degrees.

6. The strapping apparatus of claim 1, further comprising a rocker that comprises the tensioning counter-holder surface, wherein the rocker is movable to move the tensioning counter-holder surface toward and away from the tensioning wheel.

7. The strapping apparatus of claim 6, wherein the rocker is pivotable about a rocker pivot axis to move the tensioning counter-holder surface toward and away from the tensioning wheel, the strapping apparatus further comprising a rocker lever operable to control movement of the rocker.

8. The strapping apparatus of claim 1, further comprising a motor operably connected to the tensioning wheel to rotate the tensioning wheel and to the sealing element to activate the sealing element.

9. The strapping apparatus of claim 8, wherein the controller is configured to cause the tensioning wheel to rotate by controlling the motor to rotate the tensioning wheel and to cause the sealing element to activate by controlling the motor to activate the sealing element.

10. The strapping apparatus of claim 1, wherein the sealing counter-holder surface is angularly offset relative to the tensioning counter-holder surface such that, once the sealing element moves away from the sealing counter-holder surface after the sealing element seals the two overlying layers of the strapping band to each other, resetting forces present in the strapping band cause the strapping band to untwist and detach from the sealing counter-holder surface.

11. The strapping apparatus of claim 1, wherein the tensioning counter-holder surface is concave in the longitudinal direction of the strapping band when positioned in the tensioning and sealing devices.

* * * * *